United States Patent [19]

Milner

[11] Patent Number: 4,795,776
[45] Date of Patent: Jan. 3, 1989

[54] FIRE-RESISTANT COMPOSITION

[75] Inventor: Bruce A. Milner, Sawston, England

[73] Assignee: Dixon International Limited, Pampisford, England

[21] Appl. No.: 47,647

[22] Filed: May 8, 1987

[30] Foreign Application Priority Data

Jan. 29, 1987 [GB] United Kingdom ............... 8702011

[51] Int. Cl.$^4$ ............................................... C08K 3/34
[52] U.S. Cl. ................................... 524/386; 524/423; 524/437; 523/179
[58] Field of Search ............... 524/473, 503, 450, 493, 524/437, 423, 803, 386; 525/55, 68, 61; 428/437; 523/179

[56] References Cited

U.S. PATENT DOCUMENTS

| | | | |
|---|---|---|---|
| 3,202,567 | 8/1965 | Muri et al. | 524/144 |
| 3,284,216 | 11/1966 | Kaplan | 523/179 |
| 4,305,992 | 12/1981 | Langer et al. | 523/179 |
| 4,383,057 | 5/1983 | Yamamoto et al. | 524/493 |
| 4,442,157 | 4/1984 | Marx et al. | 523/179 |
| 4,599,369 | 7/1986 | Malcolm-Brown | 523/179 |
| 4,645,782 | 2/1987 | Redfarn | 523/179 |
| 4,704,418 | 11/1987 | Gomez | 524/493 |

FOREIGN PATENT DOCUMENTS 2137271 2/1973 Fed. Rep. of Germany.

*Primary Examiner*—Veronica P. Hoke
*Attorney, Agent, or Firm*—Bucknam and Archer

[57] ABSTRACT

A plastic composition which at least when hardened is resistant to fire comprises: a binder comprising a flexible film-forming adhesive polymer, such as polyvinylbutyral, in a volatile solvent, preferably a non-flammable volatile solvent such as trichloroethane, the binder having dispersed therein a fire retardant such as aluminium trihydrate, an exfoliatable mineral, such as vermiculite, and preferably also a thioxotripic agent such as precipitated silica.

20 Claims, No Drawings

FIRE-RESISTANT COMPOSITION

The present invention relates to a composition which at least when hardened is resistant to fire. In particular, but not exclusively, the composition may be a plastic composition which hardens on exposure to air. Such a plastic composition may be used as a sealant or mastic, in particular to seal around pipes, wires or ducts or other services where they pass through walls or partitions.

In accordance with the present invention there is provided a plastic composition which comprises: a binder comprising a flexible film-forming adhesive polymer in a volatile solvent, the binder having dispersed therein a thixotropic agent, a fire retardant and an exfoliatable mineral.

On exposure of the composition to air the volatile solvent evaporates causing the composition to harden.

The adhesive polymer may be polyvinyl butyral.

The volatile solvent is preferably non-flammable.

The volatile solvent may be trichloroethane. Trichloroethane evaporates sufficiently quickly in air at ambient temperature (i.e. 18°–24° C.), is non-toxic or of low toxicity and is non-flammable.

The thixotropic agent, which may be precipitated silica, serves to prevent slumping of the composition in use. It is envisaged that the thixotropic agent may be omitted in certain circumstances.

The fire retardant may be aluminium trihydrate. Aluminium trihydrate acts as a fire retardant by giving off water vapour leaving aluminium oxide, which is refractory and which, when exposed to high temperature, can combine with other inorganic material present to form a hard fire retardant crust. Such other inorganic material may include the thixotropic agent and the exfoliatable mineral.

The exfoliatable mineral may be vermiculite, which exfoliates when heated above 250° C. giving a heat-insulating material.

The binder preferably comprises dispersed therein a carbonific. The carbonific may be an organic polyhydroxy compound such as pentaerythritol.

THe binder preferably contains dispersed therein a formaldehyde resin such as melamine formaldehyde resin.

In addition to the formaldehyde resin the binder preferably contains dispersed therein a cross-linking agent for the resin. The cross-linking agent may be a polyamido compound such as dicyandiamide. At elevated temperature the formaldehyde resin is cross-linked by the cross-linking agent and acts as an additional binder. At even higher temperatures the formaldehyde resin decomposes to form a carbonaceous char which enhances the fire-resistance of the composition. Thus the formaldehyde resin serves at least in part as the carbonific.

To accelerate the rate at which the carbonific (e.g. the cross-linked formaldehyde resin and/or polyhydroxy compound) decomposed at high temperature and/or to reduce the temperature at which the cross-linked formaldehyde resin begins to decompose, the binder may contain dispersed therein an activator which promotes the decomposition of the resin.

The activator is preferably an ammonium phosphate such as monoammonium phosphate.

The binder may further contain dispersed therein a water-hardenable setting agent such as plaster of Paris ($CaSO_4.\frac{1}{2}H_2O$). The setting agent, by reaction with atmospheric water, aids in the hardening of the composition when exposed to air, acts as a filler and by giving off water vapour when heated assists in making the hardened composition fire resistant.

The binder may further contain dispersed therein a potassium, sodium aluminosilicate to prevent premature curing or hardening as a result of possible dampness in one or more of the ingredients such as the ammonium phosphate and the formaldehyde resin.

The binder may include castor oil to improve the flexibility and damp resistance of the hardened composition.

Preferred proportions, in parts by weight, of the various ingredients of the composition according to the invention are given below.

| Ingredient | Preferred proportions | More preferred proportions |
| --- | --- | --- |
| Monoammonium phosphate | 8–20 | 10–18 |
| Dicyandiamide | 3–12 | 5–10 |
| Melamine formaldehyde resin (uncured) | 7–16 | 9–14 |
| Plaster of Paris | 2–6 | 3–5 |
| Pentaerythritol | 1.5–4 | 2–3.5 |
| K, Na aluminosilicate (e.g. Silosiv A4) | 3–8 | 4–6 |
| Vermiculite (exfoliating) | 4–12 | 6–10 |
| Aluminum trihydrate | 4–12 | 6–10 |
| Polyvinyl butyral | 3–8 | 4–6 |
| Trichloroethane | 20–40 | 25–35 |
| Castor oil | 1.5–4 | 2–3 |
| Precipitated silica (e.g. Aerosil) | 0.5–2 | 0.5–1.5 |

The above parts by weight are based on a total of 100 parts by weight of the specified ingredients.

In addition, the composition may include one or more inorganic fillers such as transition metal borates (e.g. zinc, copper and iron borates), china clay, zeolites, alumina, and other common mineral fillers containing aluminium and silicon.

The composition may comprise, dispersed in the binder, expandable graphite as a filler.

The desired consistency of composition depends on the intended use of the composition. The composition may be formulated to have whatever consistency is desired. However, in general the composition is preferably formulated to be of the consistency of a conventional mastic and to be extrudable from a conventional mastic extrusion gun.

The invention includes within its scope not only the plastic compositions described above but also the hardened composition resulting from exposing the plastic composition to air.

The invention is illustrated by the following example.

EXAMPLE

The following ingredients were mixed together in the proportions (parts by weight) given.

| Ingredient | Amount |
| --- | --- |
| Monoammonium phosphate | 14.6 |
| Dicyandiamide | 7.0 |
| Melamine formaldehyde resin | 13.2 |
| Plaster of Paris | 3.8 |
| Pentaerythritol | 2.7 |
| Silosiv A4 | 5.0 |
| Vermiculite (low temperature exfoliating) | 7.0 |

-continued

| Ingredient | Amount |
| --- | --- |
| Aluminum trihydrate | 7.0 |
| Polyvinyl butyral | 5.5 |
| Trichloroethane | 30.7 |
| Castor oil | 2.4 |
| Aerosil | 1.0 |

The composition had the consistency of a conventional mastic.

The composition hardened on exposure to air.

The composition of this example can be used (before hardening) to seal around service items such as pipes, cable trays and ducts where they penetrate or pass through the inner walls of buildings. The material hardens rapidly on exposure to air, with minimal slumping, by evaporation of the trichloroethane, to give an air-tight seal around the penetrating item.

On subjecting the hardened composition to elevated temperature under fire conditions, it intumesced (expanding to 2 to 3 times its original volume) and formed a fire resistant sinter which could act as a fire barrier, that is a barrier to flames and hot gases. The sinter had a good heat-insulation value.

An independent test was carried out by The Loss Prevention Council (LPC), formerly known as FIRTO, in accordance with British Standard 476 Part 8, 1972.

In the test, the composition of this example was used to seal around a 75 mm diameter steel pipe passing through a 110 mm square hole in a 225 mm thick brick wall. After hardening of the composition it was found that the seal satisfied both the insulation and integrity requirements of this British Standard over a four hour period.

Six 2"×2" holes in a 4 sq. ft., 1½" thick Monolite test panel were filled with the composition of this example. After hardening the composition was tested in accordance with ASTM 814/81. In a first part of this testing procedure, the test panel was subjected to a one hour fire test in accordance with a time/temperature curve as specified. Then the test panel containing the composition was subjected to a stream of water from a fire hose, the water discharging at a pressure of 30 psi (210 kPa) from a 1⅛" diameter nozzle at a distance of 20' from the centre of the test panel. The water was discharged from the nozzle at the panel for 1½ seconds per square foot of exposed area of the hot panel. The refractory plugs formed by the hardened composition were held sufficiently strongly not to be dislodged by the force of the stream of water and no water passed through to the unexposed face of the panel.

In a second part of the testing procedure, a similarly filled panel was subjected to the same heating procedure for two hours. The seals formed by the hardened composition at the unexposed face of the panel remained intact for all six specimens of the hardened composition. Thus the integrity criteria of the standard were satisfied.

It has been found that the plastic composition of the invention, at least as described in the example, is sticky and adhesive but not tenaciously so. Therefore the composition is best used in confined situations.

The composition of the invention, at least as described in the example, is not adversely affected by low temperature.

Also the composition of the invention, at least as described in the example, does not shrink significantly on hardening.

It is envisaged that the composition of the invention may be used for glazing panels and ventilators, in addition to sealing around items passing through walls and partitions.

I claim:

1. A composition which is initially plastic and sticky and at least when hardened resistant to fire, comprising: a binder comprising a flexible film-forming adhesive polymer in a non-flammable volatile solvent, the binder having dispersed therein aluminum trihydrate as a fire retardant and an exfoliatable mineral.

2. A composition according to claim 1, wherein the binder also has dispersed therein a thioxotropic agent.

3. A composition according to claim 1, wherein the adhesive polymer is polyvinyl butyral.

4. A composition according to claim 1, wherein the volatile solvent is trichloroethane.

5. A composition according to claim 2, wherein the thioxotropic agent is precipitated silica.

6. A composition according to claim 1, wherein the exfoliatable mineral is vermiculite.

7. A composition according to claim 1, wherein the binder comprises, dispersed therein a carbonific.

8. A composition according to claim 1, wherein the binder contains dispersed therein a formaldehyde resin.

9. A composition according to claim 8, wherein the binder contains dispersed therein a cross-linking agent for the resin.

10. A composition according to claim 8, wherein the binder contains dispersed therein an activator which promotes the decomposition of the resin.

11. A composition according to claim 1, wherein the binder contains dispersed therein a water-hardenable setting agent.

12. A composition according to claim 1, wherein the binder contains dispersed therein a potassium, sodium aluminosilicate.

13. A composition according to claim 1, wherein the binder includes castor oil.

14. A composition according to claim 1, including at least one inorganic filler.

15. A composition according to claim 1, comprising dispersed in the binder expandable graphite as a filler.

16. A composition according to claim 1, formulated to be of the consistency of a conventional mastic and to be extrudable from a conventional mastic extrusion gun.

17. A composition according to claim 1, comprising the following ingredients in the stated proportions by weight based on a total of 100 parts by weight of said ingredients:

| Ingredient | Proportions |
| --- | --- |
| Monoammonium phosphate | 8–20 |
| Dicyandiamide | 3–12 |
| Melamine formaldehyde resin (uncured) | 7–16 |
| Plaster of Paris | 2–6 |
| Pentaerythritol | 1.5–4 |
| K, Na alumino-silicate | 3–8 |
| Vermiculite (exfoliating) | 4–12 |
| Aluminium trihydrate | 4–12 |
| Polyvinyl butyral | 3–8 |
| Trichloroethane | 20–40 |
| Castor oil | 1.5–4 |
| Precipitated silica | 0.5–2 |

18. A composition according to claim 1, when hardened by exposure to air.

19. A plastic composition for use as a sealant and which at least when hardened is resistant to fire, comprising polyvinyl butyral as a flexible film-forming adhesive polymer, a volatile non-flammable solvent, aluminum trihydrate as a fire retardant, exfoliatable vermiculite to act as a heat-insulating material when exfoliated, and silica as a thixotropic agent.

20. A plastic composition according to claim 19, comprising
- 3–8 parts by weight of polyvinyl butyral;
- 4–12 parts by weight of aluminum trihydrate;
- 4–12 parts by weight of vermiculite;
- 0.5–2 parts by weight of silica and a volatile non-flammable solvent in an amount sufficient to make the composition plastic.

* * * * *